US012762913B2

(12) United States Patent
Hanselmann et al.

(10) Patent No.: US 12,762,913 B2
(45) **Date of Patent: *Oct. 13, 2026**

(54) METHOD FOR OPERATING AN ELECTROMECHANICAL LOCKING DEVICE

(71) Applicant: DORMAKABA SCHWEIZ AG, Kempten (CH)

(72) Inventors: Stephan Hanselmann, Wetzikon (CH); Martin Buholzer, Wetzikon (CH); Stefan Greil, Wetzikon (CH)

(73) Assignee: DORMAKABA SCHWEIZ AG, Kempten (CH)

( * ) Notice: Subject to any disclaimer, the term of this patent is extended or adjusted under 35 U.S.C. 154(b) by 0 days.

This patent is subject to a terminal disclaimer.

(21) Appl. No.: 19/121,600

(22) PCT Filed: Oct. 18, 2023

(86) PCT No.: PCT/EP2023/078910

§ 371 (c)(1),
(2) Date: Apr. 16, 2025

(87) PCT Pub. No.: WO2024/083878

PCT Pub. Date: Apr. 25, 2024

(65) Prior Publication Data

US 2026/0112220 A1 Apr. 23, 2026

(30) Foreign Application Priority Data

Oct. 18, 2022 (EP) .................................... 22202298

(51) Int. Cl.
*G07C 9/00* (2020.01)

(52) U.S. Cl.
CPC ..... *G07C 9/00571* (2013.01); *G07C 9/00309* (2013.01); *G07C 9/00857* (2013.01);
(Continued)

(58) Field of Classification Search
CPC ............ G07C 9/00571; G07C 9/00309; G07C 9/00857; G07C 2009/00412; G07C 2009/00865
See application file for complete search history.

(56) References Cited

U.S. PATENT DOCUMENTS

| | | | | |
|---|---|---|---|---|
| 9,672,673 B1 * | 6/2017 | Gokcebay | ................ | G07C 9/27 |
| 2012/0096131 A1 | 4/2012 | Bhandari et al. | | |

(Continued)

FOREIGN PATENT DOCUMENTS

| | | |
|---|---|---|
| EP | 2701124 A1 | 2/2014 |
| EP | 1899924 B1 | 8/2017 |

(Continued)

OTHER PUBLICATIONS

Anonymous: "Cutoff voltage—Wikipedia" Jan. 5, 2022, XP093030048, 2 pages.

(Continued)

*Primary Examiner* — Nabil H Syed
(74) *Attorney, Agent, or Firm* — CANTOR COLBURN LLP

(57) ABSTRACT

A method for commissioning an electromechanical locking device at a location, with the locking device includes an electronic identifier, and with the method having the following steps: receiving a location-specific user input by a, in particular mobile, device for defining the location in particular, with the receiving taking place by performing the location-specific user input on the device, assigning, in particular initially assigning, the identifier to the defined location to form an ID location assignment, subsequently sending the ID location assignment by the device to a computing unit.

15 Claims, 6 Drawing Sheets

(52) U.S. Cl.
CPC .............. *G07C 2009/00412* (2013.01); *G07C 2009/00865* (2013.01)

(56) References Cited

U.S. PATENT DOCUMENTS

| | | | | |
|---|---|---|---|---|
| 2015/0221152 | A1* | 8/2015 | Andersen ................. | G07C 9/27 340/5.22 |
| 2016/0379431 | A1* | 12/2016 | Borg .................. | G07C 9/00309 340/5.28 |
| 2017/0092030 | A1 | 3/2017 | Badger, II | |
| 2020/0098216 | A1 | 3/2020 | Kuster et al. | |
| 2023/0162551 | A1* | 5/2023 | Baumgarte .............. | G07C 9/27 340/5.61 |

FOREIGN PATENT DOCUMENTS

| | | | |
|---|---|---|---|
| EP | 3300036 | A1 | 3/2018 |
| EP | 4053808 | A1 | 9/2022 |

OTHER PUBLICATIONS

International Search Report for Application No. PCT/EP2023/078910, dated Jan. 17, 2024, 3 pages.
Landrum, Ed., "Videx Scores Again" Locksmith Ledger International, Cygnus Business Media, Jun. 1, 2000, pp. 8-12.
Written Opinion for Application No. PCT/EP2023/078910, dated Jan. 17, 2024, 4 pages.

* cited by examiner

METHOD FOR OPERATING AN ELECTROMECHANICAL LOCKING DEVICE

CROSS-REFERENCE TO RELATED APPLICATIONS

This application is a 35 U.S.C. § 371 National Stage patent application of PCT/EP2023/078910, filed on 18 Oct. 2023, which claims the benefit of European patent application 22202298.0, filed on 18 Oct. 2022, the disclosures of which are incorporated herein by reference in their entirety.

TECHNICAL FIELD

The disclosure relates to a method for commissioning an electromechanical locking device at a location. Furthermore, the disclosure shows a system for commissioning the locking device at a location with which the method can be carried out.

BACKGROUND

Keys that can be inserted into electromechanical locking devices and exchange data with the locking device are known from the prior art, for example EP 1 899 924 B1. If this results in an authorisation via the data exchange, the key can be rotated in the locking device. However, the electromechanical device must first be commissioned. For example, the locking device is first assigned an authorisation and then inserted into a lock of a door during commissioning.

SUMMARY

The present disclosure provides a method for commissioning an electromechanical locking device at a location that can be carried out as efficiently and/or safely as possible. Furthermore, it is an advantage of the present disclosure to indicate a corresponding system for carrying out the method.

The advantage is achieved by providing the features of the independent claims. The dependent claims have preferred configurations of the disclosure as their subject matter. Features and details described in connection with the method according to the disclosure also apply in connection with the system according to the disclosure and vice versa. In particular, a method which can be carried out with a system according to the claims and/or a system with which a method according to one of the claims can be carried out is protected.

The disclosure shows a method for installing an electromechanical locking device at a location. The electromechanical locking device is preferably a lock cylinder, in particular a double or half cylinder, a furniture cylinder or a padlock or a similar device. The electromechanical locking device designed as a lock cylinder can be inserted into a lock (e.g. a mortise lock) on a door. The padlock can be arranged on a door, for example. It is possible to arrange the locking device on or in various closure elements, e.g. on or in doors, gates, drawers, barriers.

The location of use of the locking device can be identified, in particular uniquely, via the "location". It is preferably provided that, according to the method described below, a plurality of electromechanical locking devices are put into operation and the location is specific in such manner that it only applies to one of the locking devices put into operation and not to a plurality.

The location may be a building and/or a cabinet, such as a switch cabinet, and/or a specific room within a building and/or a specific door, for example. Furthermore, the location can also be outside a building, for example when using the locking device on a door or gate of a fence or wall.

Method step a: Firstly, in the course of the method according to the disclosure, a location-specific user input is received by way of a device for defining the location. This generates location information. The device is preferably a mobile device, for example a smartphone, tablet or laptop. Alternatively, the device can also be a terminal that is mounted in or on the building, for example on the wall, and is used for room and/or building control. It is preferably provided that the device can establish a connection to the Internet and/or a telecommunications network.

The device preferably has input means; for example, a keyboard and/or a touchscreen. The user preferably enters the input manually into the input means. Thus, it preferably concerns receiving a manually entered, location-specific user input in step a.

The input means are used in particular to allow the user to enter the location into the device. The device also preferably has output means, for example a screen, in particular a touchscreen, and/or a loudspeaker. The device preferably comprises electronics. The electronics are used in particular to process the user input and/or to output a message on the output means.

As described, the device "receives" the location-specific user input, which also means that the user input can take place by way of an external input device, such as a keyboard connected wirelessly to the device. However, it is particularly preferably provided that the location-specific user input is performed on the device, i.e. the input means is located directly on the device, for example the touchscreen or the keyboard of the device. In this way, the user manually enters information about the location on the device. In one example, the location-specific user input is entered by the user on the touchscreen of the smartphone or tablet.

The location-specific user input is used to provide the device with information about the location, referred to below as location information. The location-specific user input refers in particular to a user input of the location or a selection of the location. Examples of a user input of the location or location information are "Hotel room 308", "Office 416", "Switch cabinet Luisenstraße", "Cellar building no. 1" or an input on a two- or three-dimensional location overview plan.

This user input particularly preferably takes place while the user, in particular the fitter, is on site, i.e. at the location defined here. It is in particular provided that this receipt of the location-specific user input on the device only takes place when the fitter is on site together with the locking device to be installed. The fitter does not have to stand directly in front of the closure element in which the locking device is installed, in particular if the location is in an explosion-protected region or if no mobile phone reception is possible directly at the location.

The method according to the disclosure makes it possible for the user to select any locking device—which has not yet been configured—on site.

Method step b: Once the location-specific user input has been received by the device, an identifier (ID) is assigned to the defined location to form an ID location assignment. The ID location assignment can, for example, be a dataset in which the appropriate location is listed for the ID. However, it is also regarded as an "ID location assignment" if, for example, the ID and the location are stored in different tables and only the link between the ID and the location is saved.

The locking device preferably comprises locking device electronics.

It is provided as part of the method that a unique electronic identifier is assigned to the locking device and that this identifier is stored in the locking device in the locking device electronics, in particular on a microchip. The identifier is, for example, a character string stored in the locking device.

It is particularly preferably provided that the assignment takes place for the first time, which means that the specific identifier of the locking device is assigned to a location for the first time. Alternatively, the assignment takes place after prior deletion of an existing ID location assignment, but an assignment is preferably not possible as long as an assignment exists for the current ID.

Method step c: Once the ID location assignment has been formed, it is sent by the device to a computing unit. The ID and location can also be sent at different times, but with the link between the ID and the associated location being ensured.

The computing unit can be located anywhere. The ID location assignment is preferably sent via the Internet or the telecommunications network.

It is in particular provided that the device communicates wirelessly with the computing unit, in particular via the Internet or a telecommunications network.

The computing unit can be a server, for example. The server can also be provided virtually, in particular as a cloud service. A corresponding database is in particular stored in the computing unit. The ID location assignment preferably takes place on site.

According to the disclosure, this has the advantage that the identifier is assigned to the location in a secure manner and is made available to the computing unit as such an assignment. This assignment can be achieved efficiently by entering location information into the device.

The method also preferably comprises inserting the locking device into the associated closure element at the defined location. The closure element, in particular the door and/or lock, is preferably already installed at the location at this time. Insertion takes place before, during or after method steps a, b, c preferably immediately before or after the location-specific user input. In one example, insertion takes place before step a.

It is preferably provided that the identifier is sent at least indirectly to the device by the locking device before it is assigned to the defined location. Alternatively, the device can receive the identifier at least indirectly from the locking device. The sending or receiving is preferably at least partially wireless, in particular by means of an active wireless sending, e.g. via a radio link. Wireless near-field communication is preferably used. This makes it possible to transfer the identifier if locking devices have already been installed. The wireless connection is preferably limited to short distances, for example distances of less than 20 metres. A corresponding near-field communication technology such as Bluetooth Low Energy (BLE) or ultra-wideband (UWB) is used. The device is in particular designed to receive corresponding wireless near-field communication signals.

In principle, the locking device can send the identifier directly to the device, in particular wirelessly. However, as will be explained in detail, it is preferably provided that the locking device first sends the identifier to a key and the key relays the identifier to the device. The sending preferably takes place before step b.

The assignment, i.e. the formation of the ID location assignment, is preferably carried out by the device, in particular in the device. This means that the device receives the identifier of the locking device to be assigned before the ID location assignment. The device then merges the location information and the identifier to form the ID location assignment. For this purpose, the electronics of the device can comprise an electronic processor.

The following is in particular provided for the location-specific user input for defining the location:

The location-specific user input can take place by selecting a location from a selection list. This selection list is sent in particular to the device by the computing unit. Or the device receives the selection list from the computing unit. The user can select the appropriate location on the device while they are in particular on site to carry out commissioning.

Additionally or alternatively it is provided that the location-specific user input preferably takes place or is supplemented by a free text input. This free text input takes place in particular on the device.

In addition, the location-specific user input can also take place or be completed by selection on a location overview plan. This location overview plan is preferably sent from the computing unit to the device. Or the device receives the location overview plan from the computing unit.

The selection list and/or the location overview plan is preferably displayed on the device, in particular on the output means, in particular the screen. The selection is made by the user on the device. It can be provided that an input field is displayed on the device, in particular on the output means, in which the user can manually enter the free text.

The selection takes place in particular on the location overview plan on the device. The location overview plan can, for example, be a room overview plan that graphically represents the position of rooms within a building, such that the location is selected by clicking on a specific room or door, for example, which results in the location-specific user input. In a very similar way, the location overview plan can be a building overview plan on which the user selects a specific building in which the locking device will be installed. Furthermore, the location overview plan can also represent the various locations on a map, for example locations in the form of buildings or switch cabinets that are arranged widely distributed.

It is conceivable that the user newly creates location information. This means that the user generates location information through the user input before this generated location information has been stored in the computing unit. This allows a location to be taken into account as the installation location of the locking device that is not stored as such in the computing unit. In this way, the user creates location information. This is conceivable in particular by way of the free text input or by the selection on the location overview plan.

The individual location-specific user input can also take place using a combination of a plurality of different or identical methods described above. For example, you can first select a location from the selection list and add a text input. In a similar way, for example, a building can be selected first in the location overview plan and then the specific location can be defined in a more detailed location overview plan or via a free text input or via the selection list.

Furthermore, the method preferably takes into account that there are so-called lock systems. Within the lock system there are a plurality of the locking devices, which are put into operation in particular according to the method described here. The lock system also provides for a specific access authorisation concept. For example, a plurality of individuals authorised for access can be assigned to the lock system, with one or a plurality of the locking devices being assigned to each individual authorised for access as being authorised for access.

The individuals authorised for access can be divided into authorisation groups. For example, the lock system can relate to a block of flats. An authorisation group can be intended for the caretaker, who may lock all lock devices with the exception of the lock devices on the individual flats. Another authorisation group may be provided for flat owners, who may, for example, lock the lock devices on the front door and their own flat.

The locking devices of a lock system preferably belong to a common owner.

A lock system is additionally or alternatively preferably characterised in that the lock system comprises at least one list of blocked lock authorisations, which is referred to as a blacklist. The blocked lock authorisations can relate to one or a plurality of locking devices of the lock system. The at least one blacklist is preferably limited to a single lock system. In other words, different lock systems are distinguished by having their own blacklists.

The lock system can additionally or alternatively be characterised in that the lock system has its own encryption information, e.g. its own encryption key and/or its own encryption algorithm. The encryption information can also be referred to as cryptographic information and/or the encryption key as a cryptographic key. This means that different lock systems preferably differ in terms of encryption information.

It is preferably provided that the method comprises the following steps:

Lock system selection: A lock system selection preferably takes place by way of a lock system user input into the device. This allows the user to select a corresponding lock system—in particular before the location-specific user input. The user input takes place in particular by way of the input means. The user preferably manually enters the lock system selection into the device. A selection list for the lock system selection is preferably displayed on the device, preferably on the output means, particularly preferably on the screen. The selection is made by the user on the device. For example, the user enters the lock system on the touchscreen.

Assigning the selected lock system: Once the lock system has been selected, the selected lock system is preferably assigned to the identifier of the locking device to form an ID lock system assignment. This takes place in particular by way of the device, preferably in the device.

Sending the ID lock system assignment: The device then preferably sends the ID lock system assignment to the computing unit.

The lock system is preferably selected from a predefined selection list. The user, in particular the fitter on site, preferably cannot create a new lock system.

The ID lock system assignment and the ID location assignment can be combined to form an ID lock system location assignment. It is conceivable that in step c, the ID lock system location assignment is sent to the computing unit.

It is preferably provided that the lock system selection is taken into account during the location-specific user input. For this purpose, the device can electronically store possible locations associated with the lock system for at least one lock system.

The computing unit particularly preferably sends information about the possible locations that match the lock system to the device, in particular after it has received the ID lock system assignment. Or the device receives possible locations of the lock system from the computing unit.

The location-specific user input for defining the location preferably takes place first by way of the lock system selection and a subsequent selection of the location in the lock system. A selection list of locations is in particular provided for this purpose, which only shows locations of the selected lock system.

Additionally or alternatively, a free text input of the location takes place after the lock system selection. It is also in particular possible to create new location information within a lock system. It is also possible that after the lock system selection, a subsequent selection of the location takes place using a location overview plan of the lock system. This location overview plan has already been described above. It can preferably be provided that only locations of the respective lock system are displayed on the location overview plan.

Furthermore, it is preferably provided that a key, in particular the above-mentioned key, is used as part of the method. This key in particular has a key shank that can be introduced into the locking device. The key and key shank are preferably designed such that a torque can be transmitted to the locking device via the key shank using the key. The mechanical movement of the locking device is therefore preferably carried out with the key and not by a motorised drive in the locking device.

Furthermore, it is preferably provided that the key establishes an electrical connection to the locking device, in particular via the key shank. The connection can be used to transmit data, in particular the identifier. The connection can be wireless or wired. "Wired" (also referred to as non-wireless) means that the connection is made via at least one conductor in the key that can be brought into contact with the locking device electronics in an electrically-conductive manner. The key and the locking device can comprise corresponding electrical contacts for this purpose.

The electrical connection makes it possible to exchange data, in particular non-wirelessly, between the key and the locking device. This also makes it possible to transfer electrical energy (also known as power) from the key to the locking device.

The key preferably has an electronic key identifier, for example a character string stored in the key. Furthermore, the key is preferably designed for wireless communication with the device. Wireless communication takes place via active wireless sending, e.g. by radio. Near-field communication, for example via Bluetooth or ultra-wideband (UWB), is in particular used.

The key preferably comprises electronics. The electronics can be used to communicate with the locking device and/or the device.

It is preferably provided that the key identifier is sent from the key to the device after communication between the key and the device has been established. The device preferably sends the key identifier on to the computing unit. This allows the computing unit to verify, for example, which usage rights the key has and/or are to be assigned to the key. The device can also send further data specifically to this one key only.

As already mentioned, the identifier of the locking device is preferably sent indirectly to the device by the locking device. It is in particular provided that the locking device first sends the identifier to the key, in particular non-wirelessly. The key then relays the identifier of the locking device to the device, in particular wirelessly via near-field communication.

The key is particularly preferably introduced with its key shank in the locking device while the locking device sends the identifier to the key. The key being introduced in the locking device can be a prerequisite for the locking device sending the identifier to the key. The key being introduced in the locking device can be a prerequisite for the key receiving the identifier from the locking device.

It may be that the key is introduced in the locking device with the key shank while the key relays the identifier to the device. The key being introduced in the locking device can be a prerequisite for the key sending the identifier to the device. The key being introduced in the locking device can be a prerequisite for the device receiving the identifier from the key.

It is preferably provided that the key is introduced in the locking device with its key shank, at least temporarily during the method, in order to supply the locking device with electrical energy.

It can preferably be provided that the key is introduced in the locking device with its key shank, at least temporarily during the method, with the introduction of the key waking up the locking device electronics of the locking device to send the identifier.

As mentioned, it is preferably provided that the key sends the identifier to the device wirelessly. There is preferably located on the key a button that is pressed by the user, whereupon the communication connection between the key and the device is established. This allows the key to be in energy-saving mode most of the time until the button is pressed.

Furthermore, it is preferably provided that the following step takes place before the identifier is sent to the device: Wirelessly sending a configuration message from the device to the key. This configuration message contains the information or is to be evaluated by the key to the effect that a locking device is to be configured. Based on this configuration message, it is preferably provided that the key activates the locking device electronics accordingly such that it sends its identifier to the key.

Furthermore, the following method steps are preferably provided:

i. Receiving by way of the device location- and/or lock system-specific authorisation information sent by the computing unit. The authorisation information is sent by the computing unit and received by the device accordingly. This preferably takes place after step c, i.e. after the ID location assignment, in particular the ID location/lock system assignment, has been sent to the computing unit. Based on this ID location assignment, in particular on the ID location/lock system assignment, the computing unit can compile the required authorisation information for the locking device and send it to the device. Alternatively, a dataset can also be transmitted from the computing unit to the device before step c, which enables the device to generate the authorisation information based on the ID location assignment, in particular on the ID location/lock system assignment. This can in particular be useful if no data connection can be established between the device and the computing unit on site and the ID location assignment is only transmitted to the computing unit later.

The authorisation information is location- and/or lock system-specific, which means that the authorisation information matches the location and/or lock system. The authorisation information is preferably at least lock system-specific.

The authorisation information can contain a location- and/or lock system-specific blacklist and/or location- and/or lock system-specific electronic encryption information, in particular a location- and/or lock system-specific encryption key.

The locking device then receives authorisation information. The authorisation information can correspond to the authorisation information that the device receives from the computing unit. Alternatively, the authorisation information received from the computing unit is modified in the device and/or key. For example, authorisation information is sent from the device to the key. The authorisation information is modified in the key and sent to the locking device. It can therefore be provided that the key modifies the authorisation information, in particular the encryption information, between the receipt of authorisation information by the key and the sending of the authorisation information to the locking device.

The encryption information received by the locking device can be composed of different items of information. For example, the encryption information comprises information that is specific to the entire lock system and information that is specific to the location only. This means that the encryption information can be location- and lock system-specific. Since exactly one locking device is assigned to a location, location-specific encryption information is also to be understood as encryption information that is specific to the identifier.

When sending authorisation information, the authorisation information can, for example, first be sent wirelessly to the key and then be sent, modified or unmodified, wired or wirelessly, from the key to the locking device.

It is preferably provided that the locking device comprises an electromechanical actuator and a driver.

The driver is preferably designed to be rotationally asymmetrical and enables a closure element, in particular a door, to be unlocked or locked when rotated in the rotatable state.

For example, if the locking device is designed as a lock cylinder and inserted into a corresponding lock, the driver can move, for example, the latch or bolt in the lock. For example, the driver can correspond to a locking lug of a lock cylinder. In another example, the driver can comprise recesses in which locking elements can slide in order to unlock the shackle of a padlock.

The electromechanical actuator is activated by the locking device electronics of the locking device in an optional method step of the method in order to achieve rotatability of the driver. In this way, the actuator can cause the driver to be transferred from a non-rotatable state to a rotatable state. For example, if the locking device is designed as a lock cylinder and introduced into a corresponding lock, the driver can move, for example, the latch or bolt in the lock in the rotatable state.

The electromechanical actuator, in turn, enables the driver to be rotatable when activated accordingly by the locking device electronics. During operation of the locking device, this occurs in particular depending on whether the authorisation information stored in the locking device matches the corresponding authorisation information of the introduced key. The actuator can be designed as a solenoid or as an electric motor.

The locking device can comprise a rotor. The rotor is supported at least indirectly in a housing.

The actuator can be used to unlock the previously locked rotor such that the rotor and the driver connected to the rotor are rotatable. Additionally or alternatively, the rotor can be coupled to the driver by means of the actuator.

The locking device is preferably free of mechanical coding. This means that the rotatability of the driver depends solely on the electronic lock authorisation of the user. A large number of locking devices therefore have the same internal structure, such as a key channel, key removal barrier, electrical contacts, coupling element for the driver or similar.

It is particularly preferably provided that the electromechanical actuator is activated by waking up the locking device electronics at any time before the authorisation information is received according to step ii. in order to achieve rotatability of the driver. The authorisation information is only received by the locking device during the commissioning process described here, in particular in step ii.

Before this receipt takes place, it is preferably provided that the locking device is rotatable with any key. It is in particular provided that any key comprises no authorisation information or very generally valid authorisation information that is accepted by the locking device. Any key means a key that is compatible in a variety of locking devices comprising the same internal mechanical structure. For example, these keys must be geometrically insertable into and removable from the lock channel, have appropriate electrical contacts for electrical contacting of the corresponding contacts of the locking device and the like. The fact that the driver is rotatable by any, i.e. structurally appropriate, key before step ii makes it possible to first verify the mechanical functioning of the locking device, in particular before the identifier of the locking device is stored in the computing unit.

Thus, it is particularly preferably provided that the following steps are carried out, in particular before step a: Introducing the key such that the driver is rotatable by activating the actuator. The driver is then rotated, in particular manually.

It can in particular be provided that the driver is rotated into a position in which the locking device can be inserted into the closure element (e.g. into the door); and insertion of the locking device into or onto the closure element at the location. Alternatively, it can be provided that the driver of a padlock is rotated into a position that allows the shackle to be opened.

Furthermore, it is preferably provided that the key used comprises a, in particular multicoloured, light device, which displays a method step of the method described herein and/or a state of the key and/or a state of the locking device and/or a result of a method step of the method described herein, in particular the failure of a method step.

The key preferably comprises an electrical energy storage device.

The key verifies, in particular before sending the identifier of the locking device, whether a charge state of the electrical energy storage device of the key has fallen below a limit. If the limit is undercut, the process is cancelled. The key then in particular sends a corresponding notification to the device.

The locking device used in the method preferably has a housing and an insert. The insert comprises a stator and the rotor. The stator is preferably fastened to the housing in a form- and/or force-fitting manner. The rotor is rotatably supported in the stator. The fact that the stator and the housing are designed in two parts means that the stator can be inserted into different housings. This means that the housing can also be replaced on site if it proves to be unsuitable for installation.

The insert preferably comprises the locking device electronics and the actuator.

The disclosure further comprises a system for commissioning a locking device at a location, in particular the locking device described above. The advantageous configurations and subclaims described in the context of the method advantageously apply correspondingly as part of the system.

The system preferably comprises a computer program product for execution, in particular also storage, on a device, in particular the device described above.

The computer program product is designed to carry out the method steps of the described method on the device. The method steps that were previously described in connection with the device are thus in particular executed on the device.

Furthermore, the system preferably comprises an electromechanical locking device with an electronic identifier and locking device electronics. The locking device is designed in particular as described above. Furthermore, the locking device is designed to carry out method steps according to the method described above. The method steps described in connection with the locking device are in particular carried out in the locking device.

The system also preferably comprises the key, in particular the described key. The key is in particular designed to carry out the method steps according to the method described above, which are described in connection with the key.

The system can comprise the device and/or the computing unit.

BRIEF DESCRIPTION OF THE DRAWINGS

The disclosure will now be described further on the basis of exemplary embodiments, in which is shown.

DETAILED DESCRIPTION OF THE DRAWINGS

Figure 2:
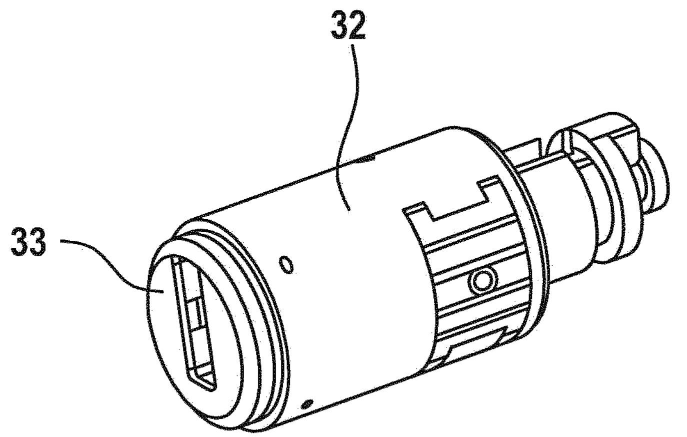
Figure 3:
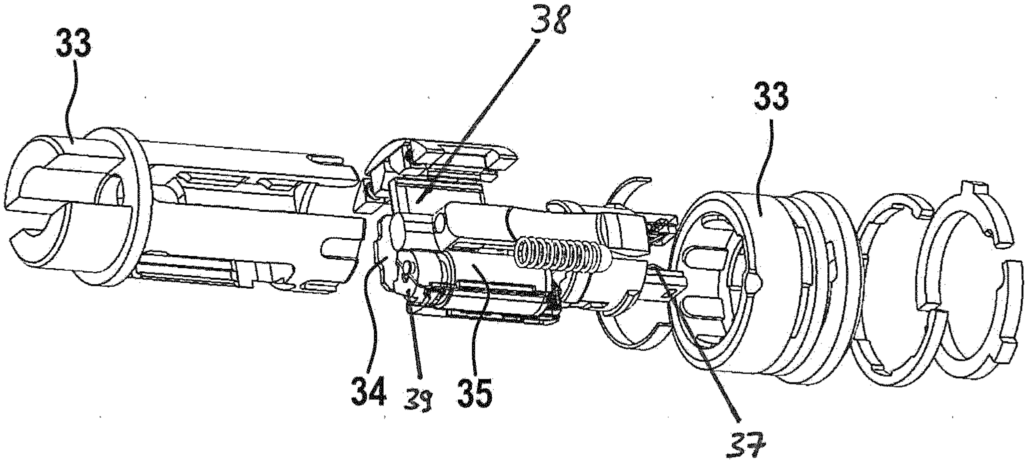

The structure of a system 2 for carrying out a method 1 is described below purely schematically on the basis of FIGS. 1 to 3. The method 1 is then explained in more detail on the basis of the schematic representation in FIGS. 4 to 7.

Figure 1:
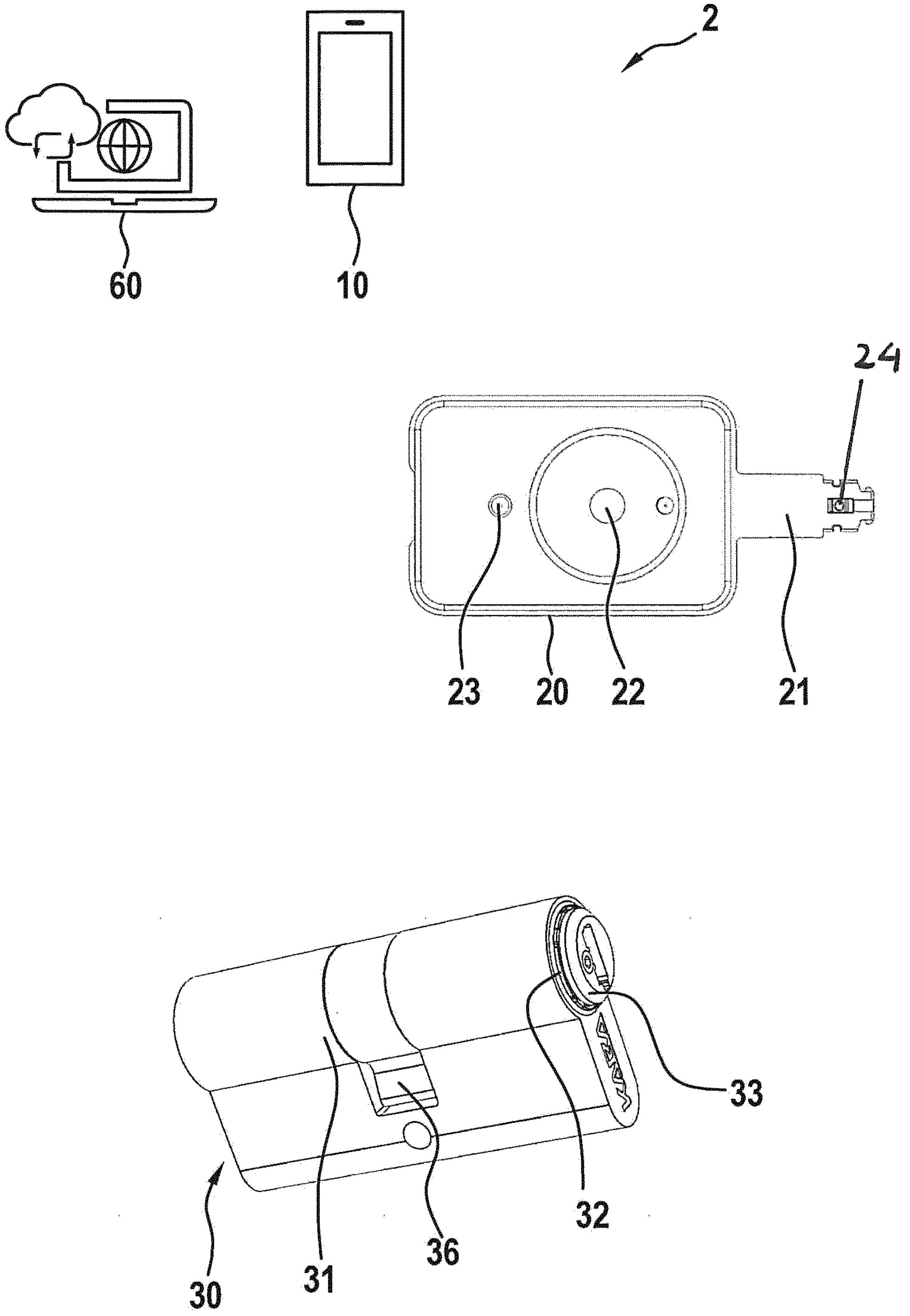
FIG. 1 a system according to the disclosure for carrying out the method according to the disclosure in accordance with all exemplary embodiments, FIG. 2 an insert of a locking device of the system according to the disclosure from FIG. 1, FIG. 3 an exploded representation of the insert from FIG. 2, FIG. 4 method steps of the method according to the disclosure in accordance with all exemplary embodiments, FIG. 5 further method steps of the method according to the disclosure in accordance with a first exemplary embodiment, FIG. 6 a schematic representation of locations of a lock system used in the method according to the disclosure in accordance with all exemplary embodiments, and FIG. 7 further method steps of the method according to the disclosure in accordance with a second exemplary embodiment.
Figure 6:
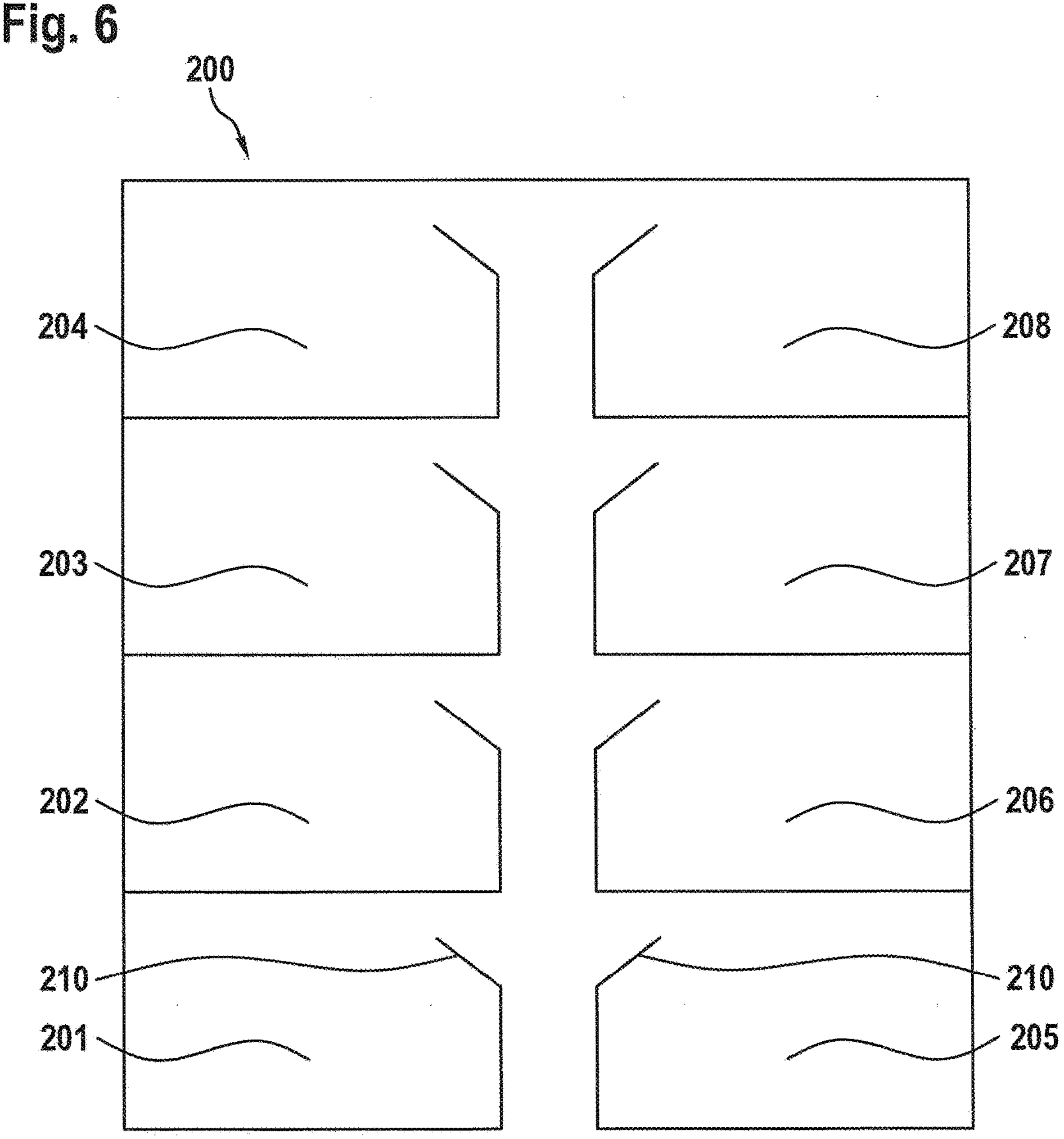

FIG. 1 shows the system 2 purely schematically. It comprises an electromechanical locking device 30, designed here as a lock cylinder. The locking device 30 is inserted into a closure element 210 at a specific location 201-208 (see FIG. 6). Various lock cylinders can be arranged at locations 201-208 (see FIG. 6) as part of a lock system 200. FIG. 6 shows a location overview plan of the lock system 200 with different locations 201-208, designed as different rooms. Each location 201-208 can be closed by a closure element 210, i.e. a door with a lock. Corresponding locking devices 30 are inserted into the closure elements 210.

Furthermore, FIG. 1 illustrates that the system 2 comprises a key 20 and a device 10. In addition, a computing unit 60 can also be assigned to the system 2. The computing unit 60 is in particular a server, for example a virtual server in a cloud.

The device 10 is in particular a mobile device, as explained in the general part of the description. The computing unit 60 and the mobile device are designed for data communication, in particular wireless data communication. In this case, the mobile device can communicate with the computing unit 60 via the Internet and/or a telecommunications network. In addition, the mobile device can communicate with the key 20 via a wireless near-field communication connection, for example BLE or UWB.

The key 20 has a key shank 21 for introduction into the locking device 30. Furthermore, the key 20 has a button 22 for activating a communication connection between the key 20 and the device 10. Appropriate signals indicating the communication connection can be output by means of a light device 23 on the key 20. In addition, the light device 23 can display when a method step has been carried out or has failed. Electrical contacts are formed on the key shank 21 in order to transmit data and electrical energy to the locking device 30 and to receive data from the locking device 30. The key 20 comprises an energy storage device to supply itself and the locking device 30 with electrical energy.

FIG. 1 also illustrates that the locking device 30 has a housing 31. A stator 32, in which a rotor 33 is inserted, is located on the housing 31. The key shank 21 of the key 20 can be introduced into this rotor 33. During operation, the rotor 33 can be rotated by rotating the key 20, provided that the correct authorisation information is exchanged between the key 20 and the locking device 30. The driver 36 shown can be rotated by rotating the rotor 33. For this purpose, the driver 36 and the rotor 33 are connected in a rotationally-fixed manner, at least when the key 20 is introduced.

Locking device electronics 34 are provided remotely. They control an actuator 35 of the locking device 30. By activating the actuator 35 accordingly, the locking device 30 can allow the rotor 33 to rotate.

If the rotation of the rotor 33 is permitted, the driver 36 is in a rotatable state. If the rotation of the rotor 33 is prevented, the driver 36 is in a non-rotatable state.

To transfer the rotor 33 and thus the driver 36 from the non-rotatable to the rotatable state, the actuator 35 rotates an asymmetrical blocking element 39. By rotating the blocking element 39, an unlocking movement of a locking bar 38 can be permitted. The locking bar 38 can engage in the stator 32 to lock the rotation of the rotor 33. The rotation of the blocking element 39 allows the locking bar 38 to disengage from the stator 32.

The locking device 30 comprises an electronic identifier ID, which is stored in the locking device electronics 34.

The key 20 is designed without mechanical coding. Therefore, only electronic authorisation information can be used to determine whether or not the user has authorisation.

Figure 4:
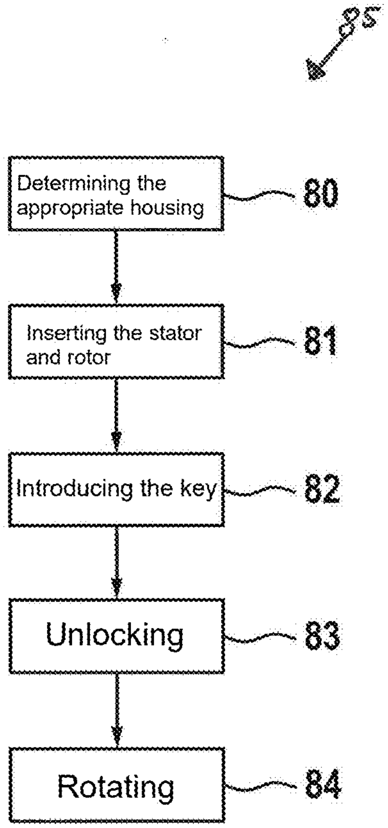

FIG. 4 illustrates method steps 85 of the method according to the disclosure, which can be optionally carried out. Accordingly, as part of the method 1 for commissioning the electromechanical locking device 30 at a location 201-208, the following may optionally take place:

80: Determining an appropriate housing 31: A user 70 (also referred to as a fitter) can first select the appropriate housing 31, in particular the housing 31 of a lock cylinder.

81: Inserting the stator 32 and the rotor 33: The stator 32 and rotor 33 are then mounted in the appropriate housing 31, in particular as a joint insert.

82: Introducing the key 20: The key 20 is preferably introduced into the locking device 30 before the locking device 30 is mounted in the closure element 210 (e.g. lock).

83: Unlocking: The actuator 35 is activated by the locking device electronics 34 such that it allows the driver 36 to move.

84: Rotating: By means of the introduced key 20, the user 70 can rotate the driver 36, in particular manually, by transmitting torque from the key 20 to the rotor 33 via the key shank 21. This allows the mechanical functioning of the locking device 30 to be verified. If necessary, the driver 36 can be rotated to the required position such that the locking device 36 can be introduced into the closure element 210 and thus mounted therein.

Figure 5:
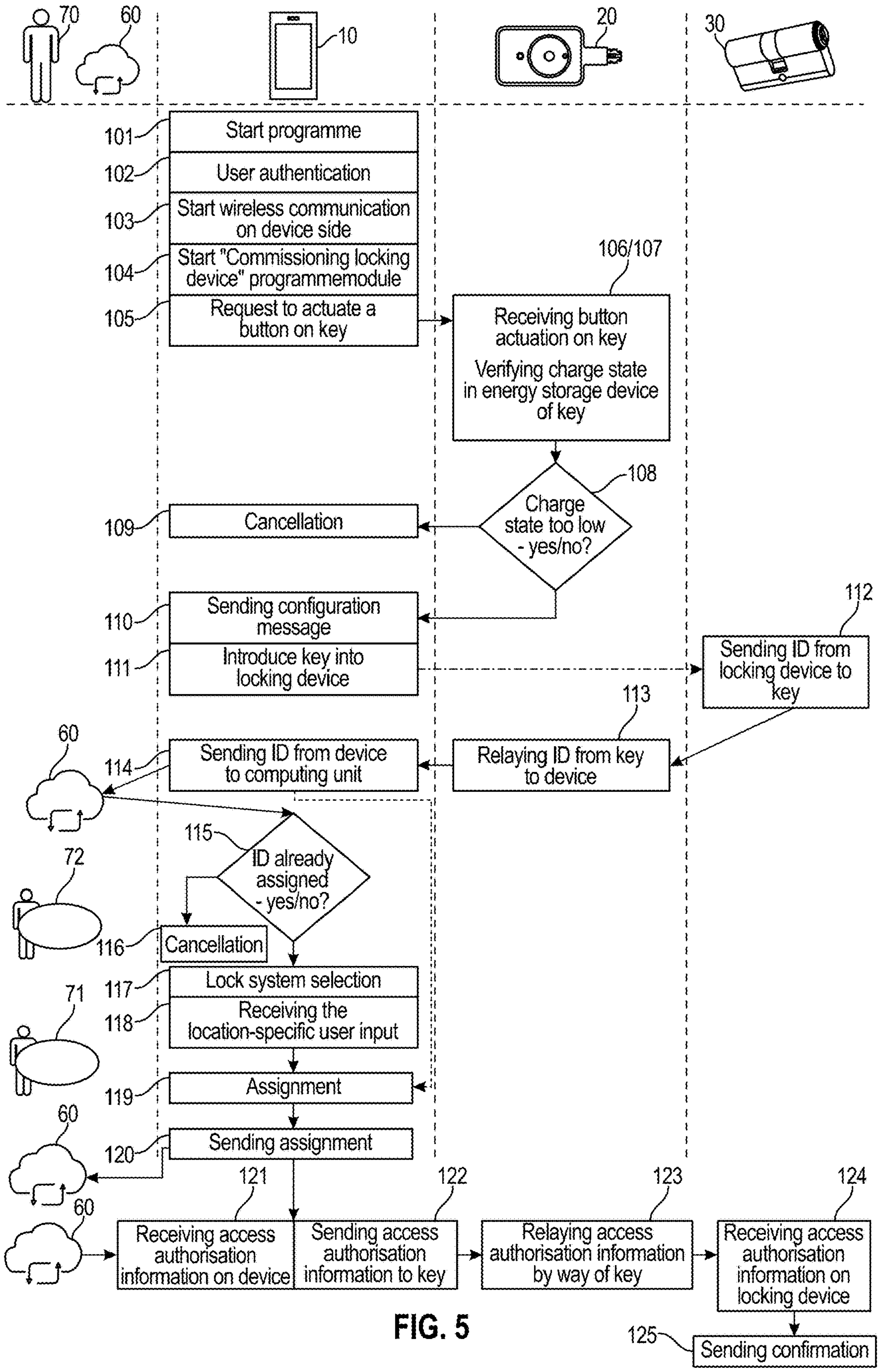

According to a first exemplary embodiment, FIG. 5 illustrates further steps of the method 1 for commissioning the electromechanical locking device 30 at the location 201-208. FIG. 5 shows purely schematically in a left-hand column method steps which are primarily to be assigned to the user 70 or the computing unit 60. The second column shows method steps which are primarily to be assigned to the device 10. The third column shows method steps which are primarily to be assigned to key 20. The fourth column shows method steps which are primarily to be assigned to the locking device 30.

As explained in the general part of the description, many of the method steps are optional and do not necessarily have to be carried out.

101: Receiving to start the programme: In this method step, the device 10 receives a corresponding input of the user 70, such that the programme, in particular computer programme product, is started on the device 10. This also means that a programme that has already been started is called up and thus placed on the operable interface of the device 10.

102: Receiving for user authentication: In this method step, the user 70 can be authenticated by the device 10 in order to determine whether they are authorised for further method steps. This can be done by entering a password directly on the device 10, for example. However, receiving also means that the device 10 captures biometric data of the user 70, for example, in order to ensure authentication.

103: Receiving for wireless communication on the device side: In this method step, it can be taken into account that wireless communication between the device 10 and the key 20 and/or between the device 10 and the computing unit 60 only takes place when the user 70 confirms this by way of a corresponding input.

104: Receiving for starting the “Commissioning locking device” programme module: In the programme, there may be a module that is explicitly called up in order to subsequently put a new locking device 30 into operation. A user input is required for this.

105: Outputting a request to actuate a button on the key: In this method step, the user 70 can be prompted to press the button 22 on the key 20 by means of the device 10, for example by means of an indication on the display.

106: Receiving the button actuation on the key 20: In this method step, the corresponding electronics in the key 20 receive the information that the button 22 has been pressed.

107: Verifying the charge state: In particular, after it has been received in step 106 that the button 22 has been pressed, a verification of a charge state of the energy storage device of the key 20 takes place in the key 20.

108: Charge state too low—YES/NO? It is determined in the key 20 whether the charge state of the energy storage device is too low, i.e. below a limit value.

109: Cancellation: If the charge state is too low, the process is cancelled. A corresponding notification is in particular displayed on the device 10, informing the user 70 that the charge state is too low.

110: Sending the configuration message: However, if the charge state is not too low according to method step 108, the key 20 informs the device 10 of this and a configuration message is sent from the device 10 to the key 20. The content of this configuration message is that a new locking device 30 is to be configured.

111: Outputting information for introducing the key: After the optional sending of the configuration message according to method step 110, a message is preferably output on the device 10 informing the user 70 that the key 20 is now to be introduced into the locking device 30. For example, a corresponding output is shown on the display of the device 10. The user 70 then introduces the key 20 into the locking device 30.

112: Sending the ID: In particular, introducing the key 20 wakes up the locking device electronics 34 and sends an identifier (ID) of the locking device 30 to the key 20.

113: Relaying the ID: The key 20 is connected non-wirelessly to the locking device 30 and receives the identifier in this way. The key 20 then relays the identifier to the device 10 via the wireless communication connection with the device 10.

114: Sending the ID to the computing unit 60: The device 10 can now relay the identifier received in method step 113 to the computing unit 60, although this is not absolutely necessary.

115: ID already assigned—YES/NO? Information can be generated in the computing unit 60 as to whether the identifier of the locking device 30 is already assigned to a location. The computing unit 60 sends this information to the device 10. Based on this information, either method step 116 or 117 is then carried out in device 10.

116: Cancellation: If it turns out that the identifier of the locking device 30 is already assigned to a location, the process is in particular cancelled. The user 70 is preferably informed of this by a corresponding output on the device 10.

117: Lock system selection: In the next step, a lock system selection can take place on the device 10, in which—as explained in detail in the general part of the description—the user 70 selects a lock system 200. For this purpose, a lock system user input 72 is made by the user 70 on the device 10.

118: Receiving a location-specific user input 71: In the next step, the user 70 performs a location-specific user input 71 on the device 10 such that the device 10 can receive the location-specific user input 71. The location-specific user input 71 in particular takes place directly on the device 10. The exact configuration of this location-specific user input 71 is explained in detail in the general part of the description and applies accordingly to the exemplary embodiment. This corresponds to step a. of the method according to the disclosure.

119: Assignment: In this method step, the device 10 uses the identifier of the locking device 30 relayed according to method step 113. During the assignment, the device 10 forms an ID location assignment, i.e. a connection between the identifier and the defined location 201-208. This corresponds to step b. of the method according to the disclosure. In addition, a connection between the defined lock system 200 and the defined location 201-208 can also take place as part of the assignment 119 by generating an ID lock system assignment. An ID location lock system assignment is preferably generated.

120: Sending the assignment: In this method step, the ID location assignment can be sent from the device 10 to the computing unit 60. Optionally, the ID lock system assignment is also sent to the computing unit 60 or the ID location lock system assignment is sent. This corresponds to step c. of the method according to the disclosure.

121: Receiving the authorisation information on the device 10: In this method step, the computing unit 60 sends authorisation information, as explained in the general part of the description, to the device 20. The authorisation information is based in particular on the ID location assignment and/or the ID lock system assignment. The arrow between method steps 120 and 121 indicates the chronological order of the steps in the device 10, namely that the device 10 first sends the assignment in step 120 and then receives the access authorisation information in step 121.

122: Sending the authorisation information to the key 20: As soon as the device 10 has received the authorisation information in method step 121, it can send it to the key 20, in particular wirelessly, according to method step 122.

123: Relaying the authorisation information by way of the key 20: The key 20 receives the authorisation information from the device 10 and relays it to the locking device 30, in particular while the key 20 is introduced. The key 20 modifies the received encryption information.

124: Receiving the authorisation information on the locking device 30: The authorisation information relayed by the key 20 is received in the locking device 30, in particular the locking device electronics 34, according to method step 124. This at least partially defines in the locking device 30 which signals a key 20 must or must not send to the locking device electronics 34 such that the actuator 35 can be activated such that the rotor 33 can be rotated by means of the key 20.

125: Sending a confirmation: After receiving the authorisation information according to method step 124, the locking device 30 can send a confirmation to the device 10, in particular via the key 20, stating that the authorisation information has been received accordingly. This is done via the key 20 (not represented).

Figure 7:
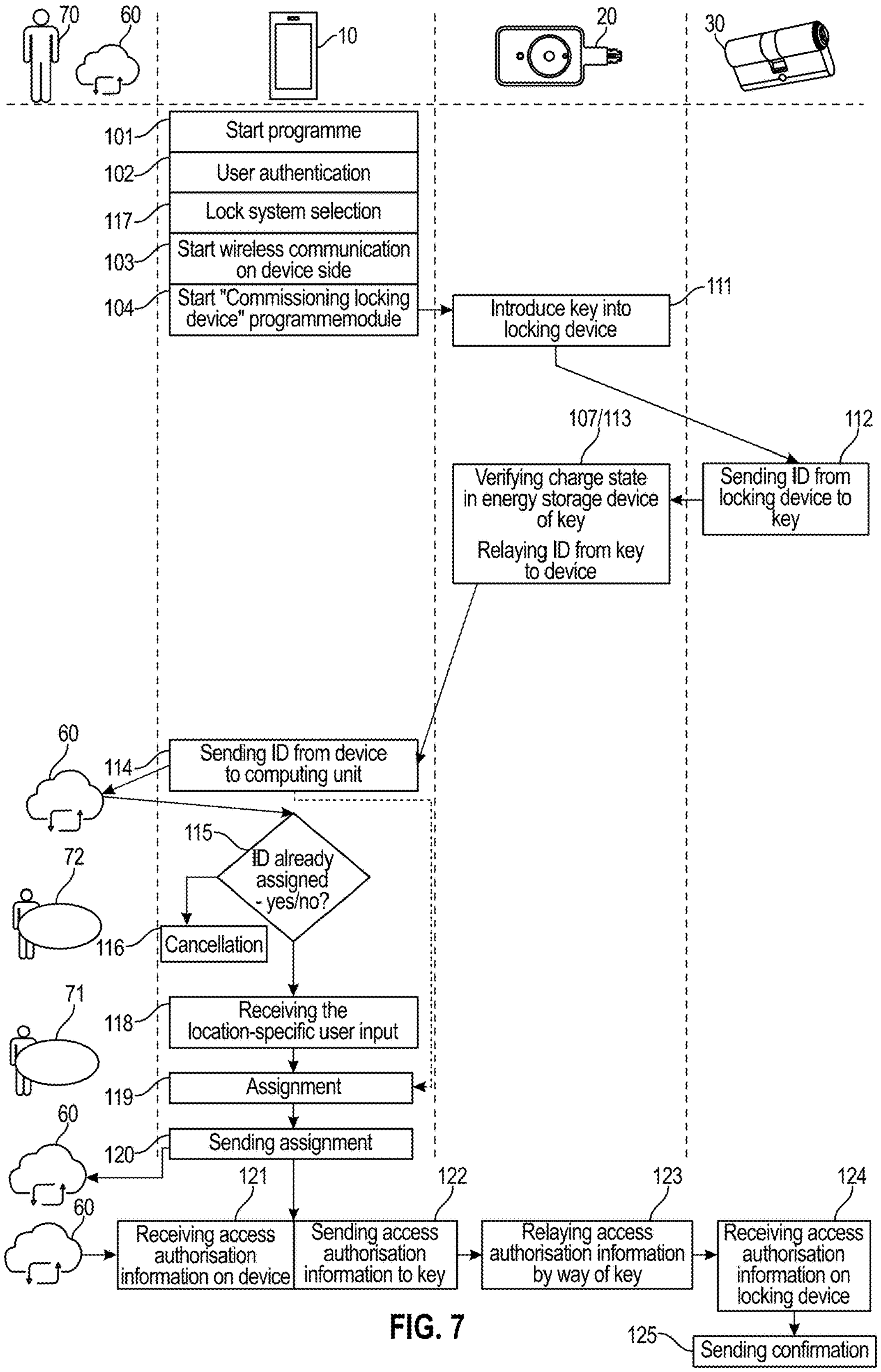

According to a second exemplary embodiment, FIG. 7 illustrates further steps of the method 1 for commissioning the electromechanical locking device 30 at the location 201-208. The methods 1 according to the disclosure and the systems 2 of the two exemplary embodiments are identical, with the exception of the differences described below:

101 and 102: as for FIG. 5.

117: According to FIG. 7, the lock system selection already takes place after step 102: A lock system selection can take place on the device 10, in which—as explained in detail in the general part of the description—the user 70 selects a lock system 200. For this purpose, a lock system user input 72 is made by the user 70 on the device 10.

103 and 104: After step 117, the optional steps 103 and 104 can follow, as described in connection with FIG. 5.

111: This is followed by step 111. In this exemplary embodiment, step 111 merely describes the introduction of the key 20 into the locking device 30. The key 20 is designed such that it is woken up when it is introduced. As a result, steps 105 and 106 can be omitted in the second exemplary embodiment according to FIG. 7, such that no button actuation on the key 20 is necessary.

112: Sending the ID: In particular, introducing the key 20 wakes up the locking device electronics 34 and sends an identifier (ID) of the locking device 30 to the key 20.

113 with 107: Relaying the ID: The key 20 is connected non-wirelessly to the locking device 30 and receives the identifier in this way. The key 20 then relays the identifier to the device 10 via the wireless communication connection with the device 10.

In this process, the charge state of the energy storage device of the key can also be verified according to step 107. If the charge state is too low, the process is cancelled. A corresponding notification is in particular displayed on the device 10, informing the user 70 that the charge state is too low.

114 to 116: as for FIG. 5.

118 to 125: as for FIG. 5.

The invention claimed is:

1. A method for commissioning an electromechanical locking device at a location, wherein the locking device comprises an electronic identifier, and wherein the method includes the following steps:

a. receiving a location-specific user input by way of a device for defining the location;

wherein the receipt takes place by performing the location-specific user input on the device, b. assigning the electronic identifier to the defined location to form an ID location assignment, c. subsequently sending the ID location assignment by the device to a computing unit, wherein the method further includes the following steps:

i. receiving location- and/or lock system-specific authorisation information from the computing unit by the device, ii. then receiving authorisation information by the locking device, wherein step i. takes place after step c, wherein the authorisation information contains location- and/or lock system-specific encryption information, wherein a key is used as part of the method, wherein the authorisation information, which the locking device receives, corresponds to the authorisation information, which the device receives from the computing unit, or wherein the authorisation information, which the locking device receives, is modified in the device and/or in the key, wherein the authorisation information is sent to the key and is then sent, modified or unmodified, wired or wirelessly, from the key to the locking device.

2. The method according to claim 1, comprising at least indirectly sending the electronic identifier by the locking device to the device, at least partially via wireless electronic communication.

3. The method according to claim 1, wherein the assignment of the electronic identifier to the location takes place by the device.

4. The method according to claim 1, wherein the location-specific user input for defining the location takes place by a free text input, for newly creating location information.

5. The method according to claim 1, further including the following steps:

lock system selection of a lock system by a lock system user input into the device, assignment of the selected lock system to the electronic identifier, by the device, to form an ID lock system assignment, subsequent sending of the ID lock system assignment by the device to the computing unit.

6. The method according to claim 5, wherein the lock system comprises its own blacklist and/or its own encryption information.

7. The method according to claim 5, wherein the location-specific user input for defining the location takes place:

by the lock system selection and a subsequent selection of the location in the lock system, by selection from a selection list of locations of the lock system;

and/or by the lock system selection and a subsequent free text input of the location;

and/or by the lock system selection and a subsequent selection on a location overview plan of the lock system.

8. The method according to claim 2, wherein the at least indirect sending of the electronic identifier from the locking device to the device includes that the electronic identifier is sent to a key and is relayed from the key to the device; wherein the key comprises a key shank for introduction into the locking device; wherein the key is introduced with the key shank into the locking device, to supply the locking device (30) with electrical energy, and/or to receive the electronic identifier from the locking device, and/or wherein the introduction of the key wakes up locking device electronics of the locking device for sending the electronic identifier.

9. The method according to claim 8, wherein the key wirelessly sends the electronic identifier to the device; wherein a button of the key was previously actuated to establish the wireless communication connection.

10. The method according to claim 8, wherein the following step takes place before the electronic identifier is sent to the device:

wirelessly sending a configuration message from the device to the key that a locking device is to be configured.

11. The method according to claim 1, wherein the authorisation information contains a location- and/or lock system-specific blacklist.

12. The method according to claim 1, wherein the locking device comprises an electromechanical actuator and a driver, wherein the electromechanical actuator is activated by locking device electronics of the locking device in order to achieve rotatability of the driver;

wherein the electromechanical actuator is activated for unlocking by waking up the locking device electronics at any time before receiving the authorisation information received according to step ii. in order to achieve rotatability of the driver.

13. The method according to claim 8, wherein the key comprises an electrical energy storage device, wherein the key verifies, before relaying the electronic identifier, whether a limit of a charge state of the electrical energy storage device is undercut, and if the limit is undercut, the method is cancelled.

14. The method according to claim 8, wherein the locking device (30) comprises a housing and an insert, wherein the insert comprises a stator and a rotor, wherein the rotor is rotatably supported in the stator, and wherein the insert comprises the locking device electronics and the actuator.

15. A system for commissioning a locking device at a location for carrying out the method according to claim 1, wherein the system comprises a device with a computer program product for execution on the device, wherein the computer program product is designed to carry out the method steps on the device, wherein the system comprises a key, wherein the key is designed to carry out the method steps, and wherein the system comprises an electromechanical locking device with an electronic identifier and locking device electronics, designed to carry out the method steps for the method, wherein the method includes the following steps:

a. receiving a location-specific user input by way of the device for defining the location; wherein the receipt takes place by performing the location-specific user input on the device, b. assigning the electronic identifier to the defined location to form an ID location assignment, c. subsequently sending the ID location assignment by the device to a computing unit, wherein the method further includes the following steps:

i. receiving location- and/or lock system-specific authorisation information from the computing unit by the device, ii. then receiving authorisation information by the locking device, wherein step i. takes place after step c, wherein the authorisation information contains location- and/or lock system-specific encryption information, wherein a key is used as part of the method, wherein the authorisation information, which the locking device receives, corresponds to the authorisation information, which the device receives from the computing unit, or wherein the authorisation information, which the locking device receives, is modified in the device and/or in the key, wherein the authorisation information is sent to the key and is then sent, modified or unmodified, wired or wirelessly, from the key to the locking device.

* * * * *